United States Patent
Dai et al.

(10) Patent No.: US 11,734,350 B2
(45) Date of Patent: Aug. 22, 2023

(54) STATISTICS-AWARE SUB-GRAPH QUERY ENGINE

(71) Applicant: PAYPAL, INC., San Jose, CA (US)

(72) Inventors: Yunjing Dai, Shanghai (CN); Jie Huang, Shanghai (CN); Jun Gu, Shanghai (CN); Zhenyu Qiao, Shanghai (CN)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/763,183

(22) PCT Filed: Apr. 29, 2020

(86) PCT No.: PCT/CN2020/087783
§ 371 (c)(1),
(2) Date: May 11, 2020

(87) PCT Pub. No.: WO2021/217497
PCT Pub. Date: Nov. 4, 2021

(65) Prior Publication Data
US 2023/0053063 A1    Feb. 16, 2023

(51) Int. Cl.
*G06F 16/901* (2019.01)
*G06F 16/903* (2019.01)
(52) U.S. Cl.
CPC .... *G06F 16/9024* (2019.01); *G06F 16/90335* (2019.01)
(58) Field of Classification Search
None
See application file for complete search history.

(56) References Cited

U.S. PATENT DOCUMENTS 9,875,270 B1 *  1/2018  Muniswamy Reddy ..................
                                              G06F 16/2343
2014/0172914 A1   6/2014  Elnikety et al.
(Continued)

FOREIGN PATENT DOCUMENTS

CN       110807061 A      2/2020
WO    WO 2011151500 A1   12/2011

OTHER PUBLICATIONS

Jin, T., et al Efficient and Accurate Retrieval of Business Process Models through Indexing: In on the Move to Meaningful Internet Systems: OTM 2010: Confederated International Conferences: CoopIS, IS, DOA and ODBASE, Hersonissos, Crete, Greece, Oct. 25-29, 2010, Proceedings, Part i, (pp. 402-409). (Year: 2010).*

(Continued)

*Primary Examiner* — Uyen T Le
(74) *Attorney, Agent, or Firm* — Haynes & Boone, LLP

(57) ABSTRACT

Methods and systems are presented for retrieving data associated with one or more portions of a graph by a computer system. Multiple graph indices are generated based on the graph. Each of the multiple graph indices stores records of data representing the graph in different formats. Upon receiving a request for accessing a sub-graph of the graph, edge-based attributes of the sub-graph are analyzed. The sub-graph may be divided into a first portion and a second portion of the sub-graph. A first graph index may be selected for retrieving records associated with the first portion of the sub-graph based on the edge-based attributes of the first portion of the sub-graph. A second graph index may be selected for retrieving records associated with the second portion of the sub-graph based on the edge-based attributes of the second portion of the sub-graph.

20 Claims, 10 Drawing Sheets

(56) References Cited

U.S. PATENT DOCUMENTS

| | | |
|---|---|---|
| 2015/0169758 A1 | 6/2015 | Assom et al. |
| 2017/0046387 A1 | 2/2017 | Cheng et al. |
| 2018/0203897 A1* | 7/2018 | Van Rest ............ G06F 16/9024 |
| 2018/0329958 A1 | 11/2018 | Choudhury et al. |
| 2021/0216516 A1* | 7/2021 | Chen .................. G06F 16/2228 |

OTHER PUBLICATIONS

Pokorný, J., Valenta, M., & Troup, M. (Jul. 2018). Indexing Patterns in Graph Databases. In Data (pp. 313-321). (Year: 2018).*

* cited by examiner

STATISTICS-AWARE SUB-GRAPH QUERY ENGINE

CROSS REFERENCE TO RELATED APPLICATIONS

This application claims priority to PCT/CN2020/087783, filed Apr. 29, 2020, which is herein incorporated by reference in its entirety.

BACKGROUND

The present specification generally relates to information retrieval from a graph data structure, and more specifically, to utilizing graph indices for sub-graph querying according to various embodiments of the disclosure.

RELATED ART

Graphs is a common data structure for representing various kinds of information by a computing device. A graph usually consists of nodes (also referred to as "vertices") and edges that connect pairs of nodes. They are especially beneficial for storing and representing relationships among different data. For example, a graph may represent relationships among users of a social network (e.g., among user accounts within an online social network, etc.). In such an example, each user within the social network may be represented by a vertex in the graph, and a relationship between two users may be represented by an edge connecting the two corresponding vertices. In another example, a graph may represent transactions among different users of a transaction system (e.g., a payment transaction system), where each user of the transaction system may be represented by a vertex in the graph, and each transaction performed between two users may be represented by an edge connecting the two corresponding vertices.

A graph can provide a clear and unique visual presentation of information to a person or a unique data representation for a computing device to perform analysis. In many situations, it may be beneficial to enable a viewer or a device to search and/or query data associated with the graph (e.g., a sub-graph) for viewing or analyzing. However, as the graph grows in size and complexity, the time and resources for retrieving data associated with a sub-graph can increase dramatically. Thus, there is a need for improving sub-graph querying performance.

Figure 1:
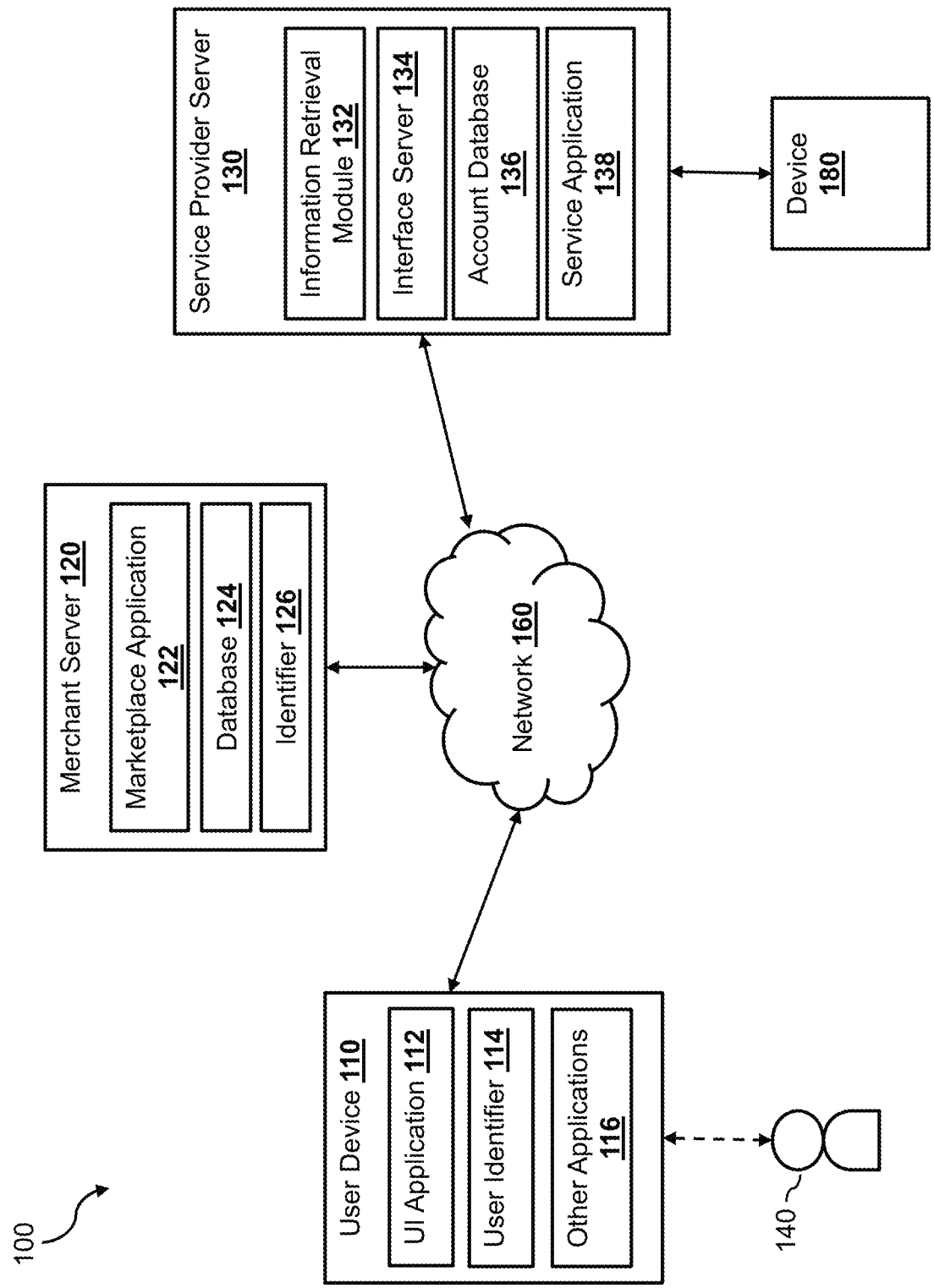
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for querying and retrieving data associated with one or more portions of a graph (e.g., one or more sub-graphs) by a computer system. As discussed above, searching and retrieving data associated with a sub-graph by a computer system can be time consuming. To facilitate searching and querying a graph, a graph index may be generated for the graph and used by the computer system for querying and retrieving data associated with different portions of a graph. The graph index may include multiple records (e.g., rows), where each record may include data associated with a vertex or an edge in the graph. To obtain data associated with a portion of the graph (e.g., a sub-graph), a computer system may search (e.g., query) and retrieve records from the graph index that are associated with the portion of the graph. Using a subset of records from the graph index, the computer system may re-construct the portion of the graph and visually present the sub-graph on a display.

The time required for the computer system to retrieve the subset of records from the graph index may vary due to the characteristics of the subset of records. Typically, the time required to obtain data associated with the subset of records depends on relative locations of the subset of records within the graph index. In general, the time for the computer system to determine a location of a random record (an initial record) in the graph index (e.g., to determine a pointer pointing to the location of the record) is substantially larger than the time for the computer system to determine a location of a subsequent record (e.g., the next record within the graph index) once the location of the initial record is determined (e.g., it could be 1,000 times larger). Thus, when the subset of records associated with the portion of the graph are close to each other (e.g., adjacent or consecutive records), the time required for obtaining the data would be substantially lower, as the computer system is only required to determine the location of one record (or a select few) and the remaining of the subset of records can be located quickly based on the location of that one record (e.g., by traversing down the graph index from the location of the one record). By contrast, when the subset of records is not next to each other in the graph index (e.g., all of the records in the subset are separated by other records in the graph index), the time required for obtaining the data would be substantially higher, as the computer system is required to determine the random locations for many of the records in the subset of records.

Accordingly, the computer system may generate a graph index that represents data of a graph in a manner that would induce fast retrieval of records. In some embodiments, the computer system may generate a graph index based on a format (e.g., an arrangement). For example, the records in the graph index may be arranged based on the format (or arrangement), such that records having a common attribute (e.g., related to the same vertex, etc.) may be stored next to each other in the graph index. This way, when searching for a sub-graph associated with a subset of vertices, the computer system can locate all of the records related to each of the subset of vertices quickly.

The design of the graph index would be simpler if the records in the graph index only have one key attribute on which queries against the graph index would be based. However, for some types of graphs, the records in the graph index may be associated with multiple attributes. Using an example in which the graph represents transactions between users of a transaction system (e.g., a payment transaction system, etc.), each record in the graph index may include data associated with a transaction (e.g., an edge in the graph). Thus, the record may include a source attribute indicating an identity of a source (e.g., a buyer, a payor, etc.) of the transaction, a destination attribute indicating an identity of a destination (e.g., a seller, a payee, etc.) of the transaction, a time attribute indicating a time when the transaction was conducted, and possibly other attributes related to the transaction. The computer system may receive a request for retrieving data of a sub-graph based on multiple attributes, such as a request for a sub-graph that represents all of the transactions among a subset of users within a particular time period.

To enhance the performance of data retrieval from the graph representing transactions among users, the computer system may generate a first graph index for the graph, where the records of the first graph index are arranged according to a first format (e.g., a first arrangement). In some embodiments, the first format may specify an order of priority for the attributes, such as assigning a higher priority to the source attribute, and then a lower priority to the time attribute, and then an even lower priority to the destination attribute. According to the first format (e.g., the order of priority), the computer system may arrange (e.g., sort) the records first based on the source attribute such that records associated with the same source are located next to each other (e.g., consecutive records) in the graph index, then based on the time attribute such that transactions associated with the same source and having similar times are located next to each other, and then based on the destination attribute such that the records associated with the same source, the same time, and same destination are located next to each other.

The first graph index that is arranged according to the first format may provide faster sub-graph retrieval time than a graph index having no arrangements (e.g., records are randomly located within the graph index). However, while the first graph index provides good sub-graph retrieval performance in some circumstances, the sub-graph retrieval performance is poor when using the first graph index in other circumstances, especially when the number of transactions associated with the subset of vertices is large. This is because even though the records associated with transactions with a common source attribute (e.g., a common payor, a common buyer, etc.) are stored next to each other, those records having the same source attribute and the same destination attribute may be separated from each other by other records that have the same source attribute but different destination attributes, due to arrangement of these records based on the time attribute before the destination attribute. For example, two transaction records having the same source attribute and the same destination attribute that were conducted at time t1 and time t2, respectively, may be separated in the graph index by a record having the same source attribute but a different destination attribute that was conducted at time t3, when t3 is between t1 and t2.

Thus, according to various embodiments of the disclosure, the computer system may generate a second graph index for the graph that represents transactions of the users, where the records of the second graph index are arranged according to a second format (e.g., a second arrangement). In some embodiments, the second format may specify an order of priority different from the first format. For example, based on the second format, the computer system may assign a higher priority to the source attribute, and then a lower priority to the destination attribute, and then an even lower priority to the time attribute. According to the second format, the computer system may arrange (e.g., sort) the records first based on the source attribute such that records associated with the same source are located near each other in the graph index, then based on the destination attribute such that transactions associated with the same source and the same destination are located near each other, and then based on the time attribute such that the transaction records associated with the same source and destination, and having similar times are located near each other.

Using the second graph index for retrieving a portion of the graph (e.g., a sub-graph) may provide better performance than the first graph index in certain scenarios, such as when the number of edges associated with each vertex in the sub-graph is high (e.g., higher than a threshold), as discussed above. For example, when the query is a request for a sub-graph that represents all of the transactions among a subset of users within a particular time period, since all of the transactions between each pair of users within the subset of users are located next to each other, the retrieval time for retrieving the transactions between each pair of users would be low.

However, it has been appreciated by Applicant that using the second graph index for retrieving a portion of the graph may provide worse performance than using the first graph index in some other scenarios, such as when the number of edges associated with each vertex in the sub-graph is low (e.g., lower than the threshold). Thus, according to various embodiments of the disclosure, to enhance the performance of data retrieval from a graph, the computer system may analyze the request for a sub-graph and selectively use one or more graph indices to retrieve data associated with the sub-graph based on the analysis of the request. In some embodiments, the computer system may analyze edge-based attributes of the sub-graph in the request for determining which one or more graph indices to use for retrieving data associated with the sub-graph. In some embodiments, the computer system may generate and maintain a database that stores attributes of the graph, such as the number of edges associated with each vertex in the graph. Thus, when the computer system receives the request for data associated with a sub-graph, the computer system may determine edge-based attributes of the sub-graph (e.g., the number of edges associated with each vertex in a subset of vertex within the sub-graph) by accessing the database. Based on the edge-based attribute of the sub-graph (e.g., the number of edges associated with each vertex in the sub-graph), the computer system may select one or more graph indices for retrieving data associated with the sub-graph. Since the graph may be modified over time (e.g., adding or removing indices based on users joining or leaving the transaction system, adding or modifying edges based on transactions conducted among users, etc.), the computer system may update the database as well as the graph indices to reflect the state of the graph (e.g., periodically, whenever a change occurs in the graph, etc.).

In some embodiments, the computer system may determine to use the first graph index for retrieving data associated with the sub-graph when the edge-based attribute (e.g., a total number of edges in the sub-graph, an average number of edges associated with a vertex in the sub-graph, a range of numbers of edges in the sub-graph, etc.) is below a threshold, and to use the second graph index for retrieving data associated with the sub-graph when the edge-based attribute is above the threshold.

The threshold that is used for selecting graph indices to use for retrieving data associated with a sub-graph may be different for different graphs based on different characteristics of the graphs. As such, the computer system may determine the threshold for the graph based on characteristics of the graph. In some embodiments, the computer system may determine a distribution of degrees (e.g., number of edges for each vertex) across the set of vertices in the graph. The distribution may indicate a number of (or a percentage of) vertices in the graph having a particular number of edges (or a range of numbers of edges). Thus, the distribution may indicate that 70% of the vertices in the graph have between 0 and 5 edges, 9% of the vertices in the graph may have between 5 and 10 edges, 5% of the vertices in the graph have between 10 and 20 edges, 2% of the vertices in the graph have between 20 and 30 edges, and so forth.

The computer system may determine the threshold number of edges (also referred to as the "critical point") where the reduction in the number (or percentage) of vertices associated with the number of edges (or the range of numbers of edges) immediately below the threshold number and the number (or percentage) of vertices associated with the number of edges (or the range of numbers of edges) immediately above the threshold number is the greatest. Since the graph may be modified over time (e.g., adding or removing indices based on users joining or leaving the transaction system, adding or modifying edges based on transactions conducted among users, etc.), the computer system may determine an updated threshold based on updated characteristics of the graph (e.g., periodically, whenever a change occurs in the graph, etc.). In some embodiments, the computer system may dynamically determine the threshold based on the updated database that stores the number of edges associated with each vertex in the graph.

In some embodiments, to further enhance the performance of a data retrieval request associated with a sub-graph, instead of selecting one or more graph indices to process the entire data retrieval request, the computer system may divide the data retrieval request into different portions and use different graph indices to process the different portions of the data retrieval request. For example, the computer system may divide the data retrieval request (e.g., divide the sub-graph associated with the data retrieval request) into two or more portions based on analyzing edge-based attributes of different parts (e.g., different vertices) within the sub-graph. In some embodiments, the computer system may determine a first portion of the sub-graph based on the vertices in the first portion of the sub-graph having edge-based attributes below the threshold and determine a second portion of the sub-graph based on the vertices in the second portion of the sub-graph having edge-based attributes above the threshold. The computer system may then retrieve first data associated with the first portion of the sub-graph using the first graph index, and retrieve second data associated with the second portion of the sub-graph using the second graph index. The computer system may combine the first data and the second data to generate the output data for the data retrieval request. In some embodiments, the computer system may transmit the output data to the device that submitted the data retrieval request. In some embodiments, the computer system may also construct the sub-graph based on the first and second data obtained from the first and second graph indices. The computer system may then present the sub-graph on the device.

FIG. 1 illustrates an electronic transaction system 100, within which the computer system for graph data retrieval described herein may be implemented according to one embodiment of the disclosure. The electronic transaction system 100 includes a service provider server 130, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online purchase transaction with the merchant server 120 via a website hosted by the merchant server 120, a mobile application associated with the merchant server 120, or a point-of-sale (POS) system associated with the merchant server 120. The user 140 may also log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface application 112 (e.g., a web browser, a mobile payment application, etc.), which may be utilized by the user 140 to conduct electronic transactions (e.g., online payment transactions, etc.) with the merchant server 120 and/or the service provider server 130 over the network 160. In one aspect, purchase expenses may be directly and/or automatically debited from an account related to the user 140 via the user interface application 112.

In one implementation, the user interface application 112 includes a software program (e.g., a mobile application) that provides a graphical user interface (GUI) for the user 140 to interface and communicate with the service provider server 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile) maintained by the service provider server 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

Even though only one user device 110 is shown in FIG. 1, it has been contemplated that one or more user devices (each similar to user device 110) may be communicatively coupled with the service provider server 130 via the network 160 within the system 100.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as payment intermediary between customers of the merchant and the merchant itself. For example, the merchant server 120 may use an application programming interface (API) that allows it to offer sale of goods or services in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. Even though only one merchant server 120 is shown in FIG. 1, it has been contemplated that one or more merchant servers (each similar to merchant server 120) may be communicatively coupled with the service provider server 130 and the user device 110 via the network 160 in the system 100. As such, the service provider server 130 may facilitate payment transactions for users with different merchants associated with different merchant servers similar to the merchant server 120.

The service provider server 130, in one embodiment, may be maintained by a transaction processing entity or an online service provider, which may provide processing for electronic transactions between users (e.g., the user 140 of user device 110), between merchants, and/or between users and merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by Pay-Pal®, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the data server 134 may include pre-generated electronic content ready to be served to users. For example, the data server 134 may store a log-in page and is configured to serve the log-in page to users for logging into user accounts of the users to access various service provided by the service provider server 130. The data server 134 may also include other electronic pages associated with the different services (e.g., electronic transaction services, etc.) offered by the service provider server 130. As a result, a user may access a user account associated with the user and access various services offered by the service provider server 130, by generating HTTP requests directed at the service provider server 130.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 includes an information retrieval module 132 that implements the computer system as discussed herein for retrieving data associated with a graph. The information retrieval module 132 is configured to process data retrieval requests for data associated a graph data structure stored in a computer data storage. In some embodiments, the information retrieval module 132 may generate two or more different graph indices based on the data associated with the graph data structure to enhance the performance of retrieving data associated with the graph data structure. The two or more different graph indices may arrange the data associated with the graph data structure according to different formats (e.g., different arrangements). The information retrieval module 132 may receive a request for access data associated with a portion of the graph data structure (e.g., a sub-graph), for example, from a device 180. In some embodiments, the device 180 may be a device that is communicatively coupled to an internal network associated with the service provider server 130.

Upon receiving the request, the information retrieval module 132 may determine one or more graph indices for retrieving the data associated with the sub-graph. In some embodiments, the information retrieval module 132 may analyze attributes associated with the sub-graph (e.g., the number of edges associated with each vertex in the sub-graph), and select the one or more graph indices for retrieving data associated with the sub-graph. For example, the information retrieval module 132 may determine whether an edge-based attribute associated with the sub-graph is above or below a predetermined threshold, and may determine to use one of the two or more graph indices to retrieve data associated with the sub-graph. In some embodiments, the information retrieval module 132 may divide the data retrieval request into different portions and may determine to use different graph indices to retrieve data associated with different portions of the sub-graph based on the edge-based attributes of the vertices in the sub-graph.

Figure 2:
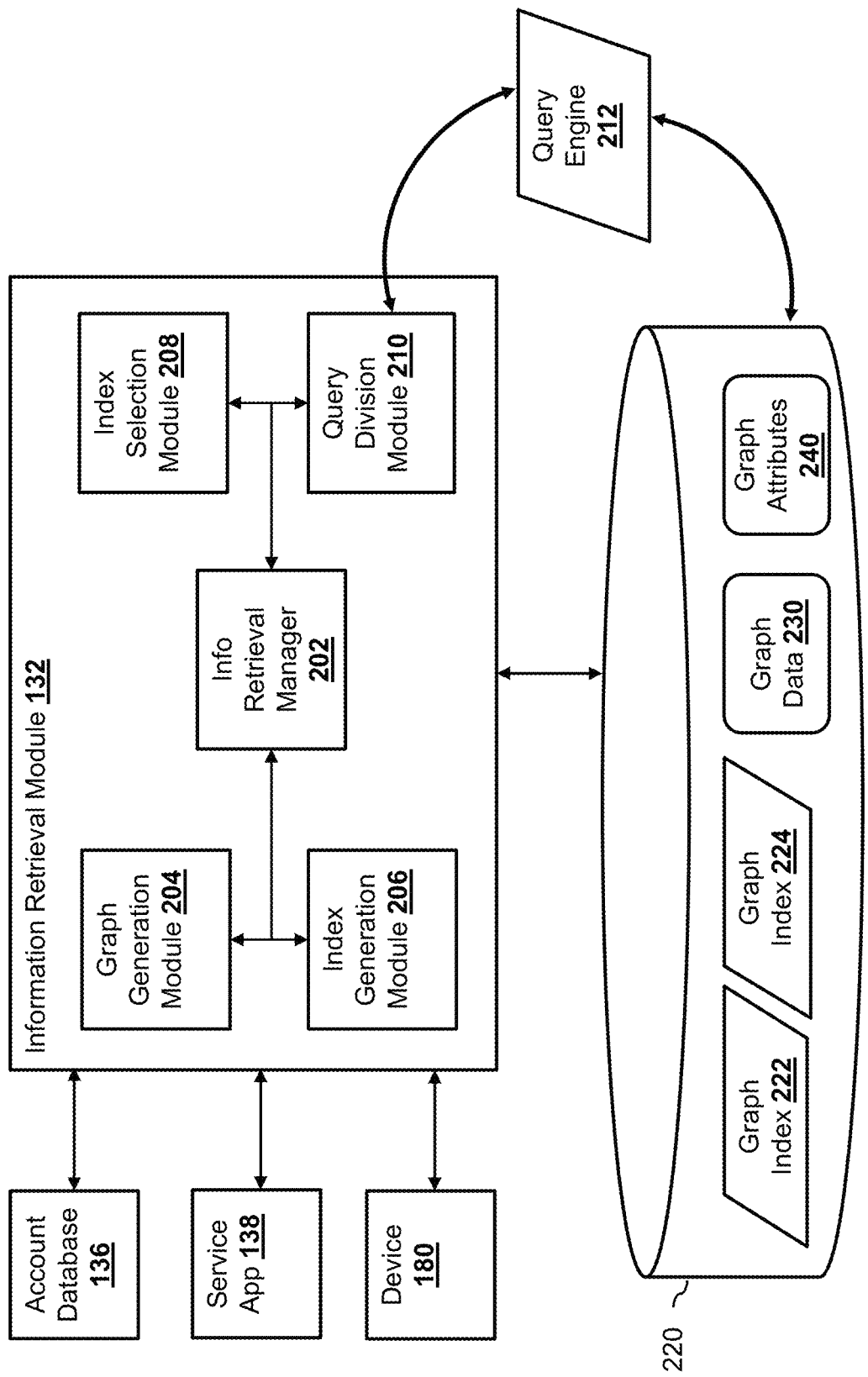
FIG. 2 is a block diagram illustrating an information retrieval module according to an embodiment of the present disclosure.

FIG. 2 illustrates a block diagram of the information retrieval module 132 according to an embodiment of the disclosure. The information retrieval module 132 includes an information retrieval manager 202, a graph generation module 204, an index generation model 206, an index selection module 208, and a query division module 210. Some or all of the information retrieval manager 202, the graph generation module 204, the index generation model 206, the index selection module 208, and the query division module 210 may be implemented as computer software programs.

As discussed above, a graph data structure can be a useful tool for storing and representing relationships among different entities. Not only that the graph data structure can provide a unique visual presentation for people to view data showing the relationships among the different entities, it can also enable a person or a computer program to perform analysis on the relationships among the different entities. For example, a transaction system such as the online service provider associated with the service provider server 130 may use a graph data structure to represent transactions among different users of the online service provider. The graph data structure that represents transactions among different users may enable the service provider server 130 to perform analysis, such as risk analysis associated with a new transaction submitted by a use (or a user account), marketing analysis for determining high transaction areas, compliance analysis for determining whether any of the transactions fail to comply with regulations or laws, or other types of analyses.

As such, the graph generation module 204 may use information from the account database 136 (e.g., user account information, transaction information, etc.) to generate a graph data structure for representing transactions among the different users of the online service provider. In some embodiments, the graph generation module 204 may generate the graph data structure by creating a vertex (e.g., a node) for representing each user (or user account) of the online service provider and creating an edge that connects two nodes for representing each transaction between two corresponding users (or user accounts).

Figure 3:
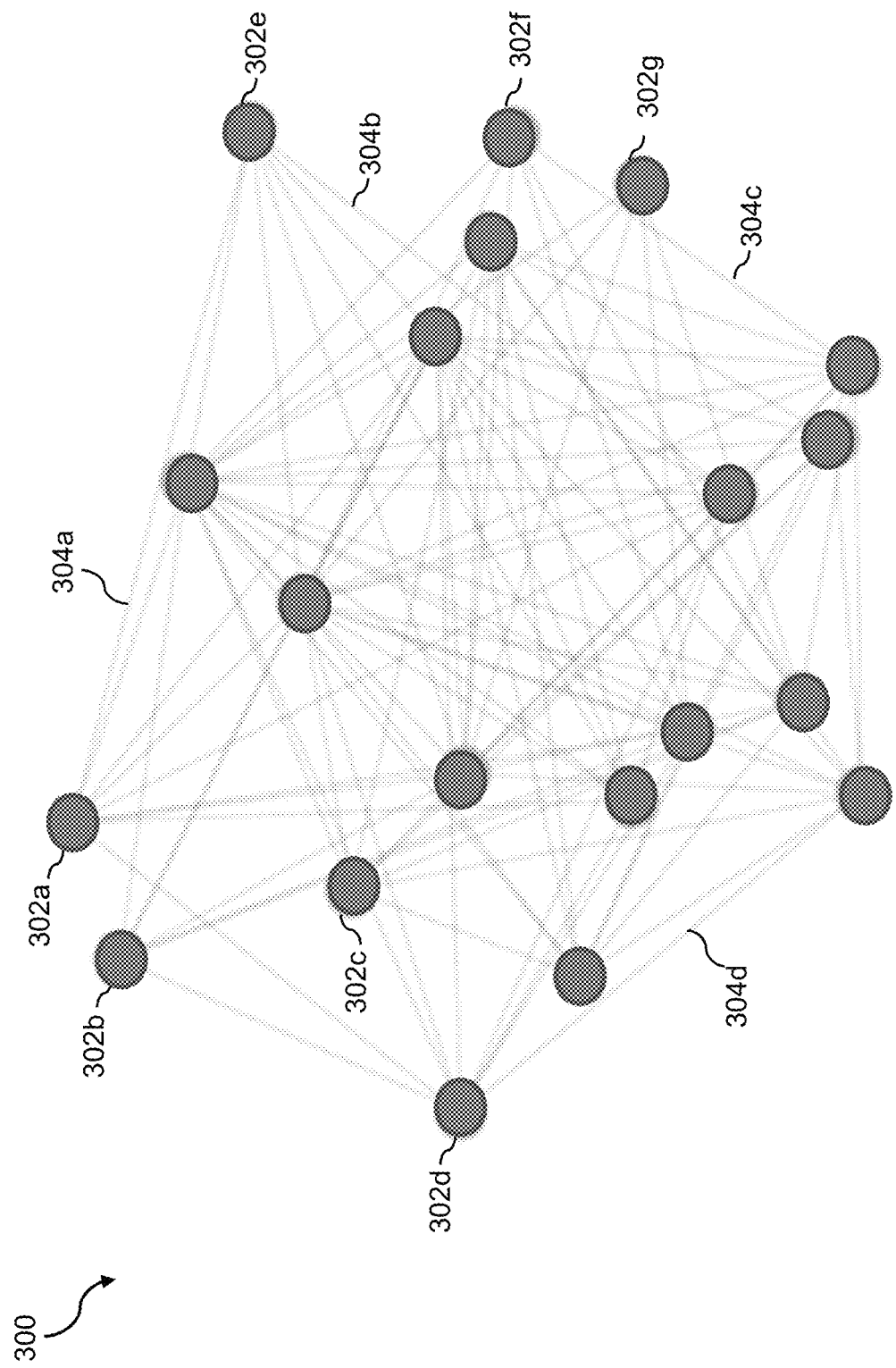
FIG. 3 illustrates an exemplary graph according to an embodiment of the present disclosure.

FIG. 3 illustrates an example graph 300 generated by the graph generation module 204 based on information retrieved from the account database 136 according to one embodiment of the disclosure. As shown, the graph 300 includes vertices (e.g., vertices 302a-302g) and edges (e.g., edges 304a-304d). Each of the vertices in the graph 300 represent a user account. As such, each vertex in the graph 300 represents a distinct user account of the service provider server 130, and may include or is associated with attributes of a corresponding user account (e.g., a name, a gender, an age, a geographical area, or other account attributes). Each edge connecting two vertices in the graph 300 represents a distinct transaction conducted between two user accounts corresponding to the two connected vertices. Thus, more than one edge may exist between two vertices in the graph 300 when multiple transactions have been conducted by the two user accounts corresponding to the two vertices. Each edge may also store or is associated with attributes of a corresponding transaction (e.g., a source attribute identifying a source user account such as a buyer or a payer, a destination attribute identifying a destination user account such as a seller or a payee, a time attribute representing a time when the transaction was conducted, an amount attribute representing an amount involved in the transaction, and other transaction attributes).

In some embodiments, the information retrieval manager 202 may store data associated with the graph 300 as graph data 230 in data storage 220. The graph generation module 204 may be configured to modify the graph 300 based on updated information from the account database 136. For example, as user accounts are created and/or deleted, the graph generation module 204 may modify the graph by creating or removing vertices. Similarly, as new transactions are conducted, the graph generation module 204 may add additional edges connecting vertices based on the new transactions. As the number of user accounts and/or the number of transactions conducted by the user accounts increases, the size and complexity of the graph 300 (and graph data 230) also grow. Since the graph 300 has no predefined structure (e.g., unlike a tree structure), searching through the graph to locate a vertex representing a user account or to locate an edge representing a transaction can be time consuming. In an extreme example, to search for a particular transaction (e.g., conducted between user account A and user account B within the past 24 hours), the information retrieval module 202 may have to traverse every vertex and every edge of the graph 300 in order to locate an edge representing the particular transaction.

Figure 4:
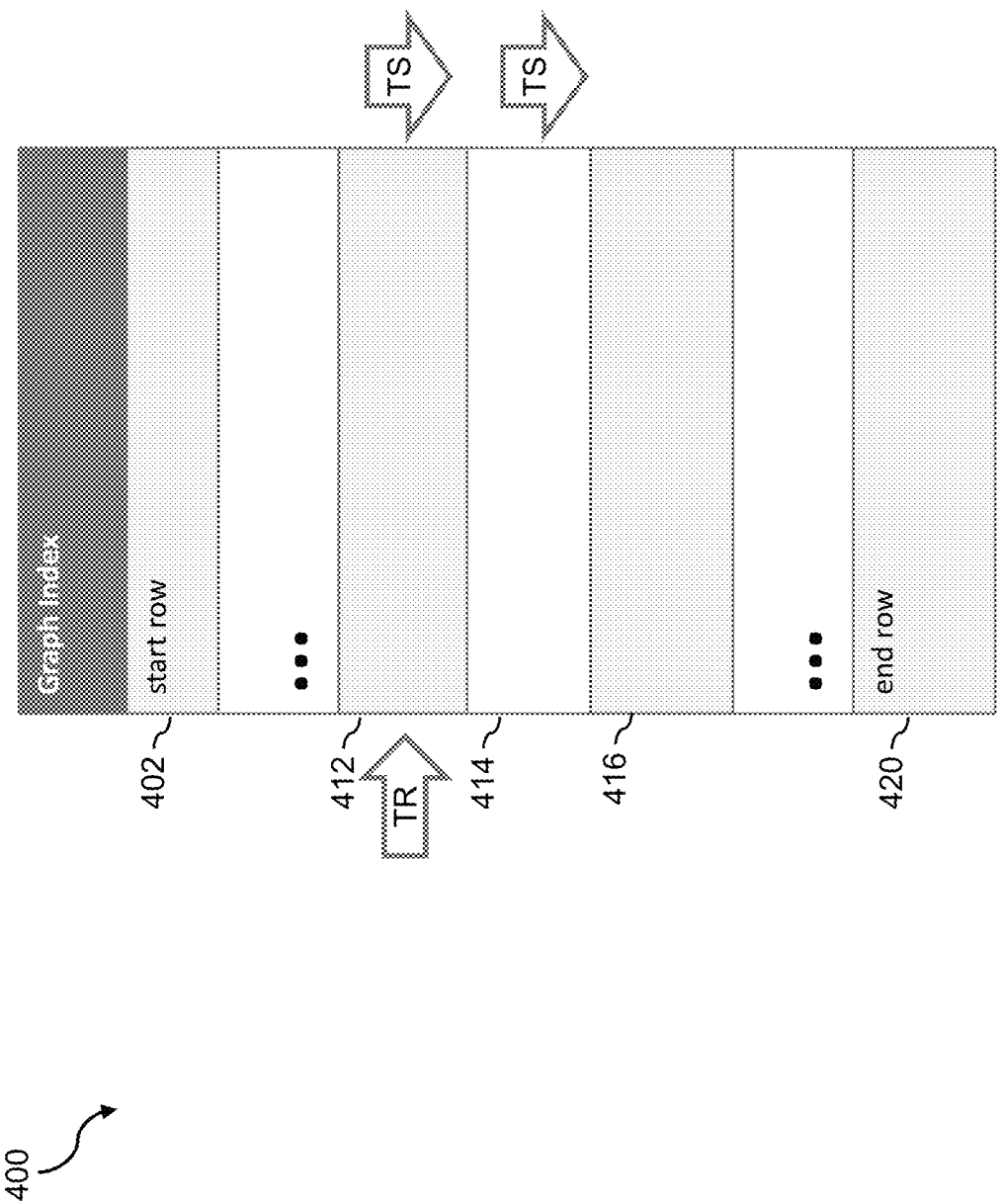
FIG. 4 illustrates an exemplary graph index according to an embodiment of the present disclosure.

As such, in some embodiments, the index generation module 206 may generate one or more graph indices based on the graph data 230 for retrieving data from the graph 300. For example, the index generation module 206 may generate graph indices 222 and 224 based on the graph data 230. Each of the graph indices 222 and 224 may be generated based on the graph data 230 and may store the graph data 230 in an easily searchable format, such as a relational database, key-value pairs, etc. Each of the graph indices 222 and 224 may include multiple records (e.g., rows), each record stores data associated with a vertex (a user account) and/or an edge (a transaction). FIG. 4 illustrates an example graph index 400 generated by the index generation module 206 according to one embodiment of the disclosure. The graph index 400 includes many records (e.g., rows), such as records 402-420 that are stored in a linear fashion (one after another). As shown, the graph index 400 begins with the record 402 and ends with the record 420, and a number of records, including the records 412-416 are stored in between the records 402 and 420.

Each record (e.g., row) may include one or more keys (e.g., primary keys) for facilitating searching of the records. For example, the one or more keys may include a source attribute of a transaction, such that the information retrieval manager 202 may use a query engine 212 to query one of the graph indices 222 and 224 based on a source attribute (e.g., retrieving all transaction records having a particular user account as the source user account such as a buyer account or a payor account). The one or more keys may also include a time attribute of a transaction, such that the information retrieval manager 202 may use the query engine 212 to query one of the graph indices 222 and 224 based on a time attribute (e.g., retrieving all transaction records conducted within a particular time period). Furthermore, the one or more keys may also include a destination attribute of a transaction, such that the information retrieval manager 202 may use the query engine 212 to query one of the graph indices 222 and 224 based on a destination attribute (e.g., retrieving all transaction records having a particular user account as the destination user account, such as a seller account or a payee account).

While retrieving data associated with the graph 300 using the graph indices 222 or 224 provides better performance (e.g., time required for the retrieval) than searching through the graph data 230, the performance (e.g., time required for retrieving records from a graph index) may vary due to the characteristics of the records requested such as an arrangement of the requested records. Typically, the time required to obtain data associated with the requested records depends on relative locations of the requested records within the graph index. For example, the time for accessing a random record (e.g., the record 412) within a graph index (e.g., the graph index 400) is substantially large (the amount of time for accessing a random record within a graph index may be referred to as "TR"). By contrast, the time for accessing a subsequent record (e.g., the next record within the graph index such as the record 414 in the graph index 400) once the location of the initial record (e.g., the record 412) is found is substantially smaller (the amount of time for accessing a subsequent record within the graph index may be referred to as "TS" where TR may be 1,000 times or more larger than TS).

Thus, when the requested records associated with the portion of the graph are close to each other (e.g., adjacent or consecutive records), the time required for obtaining the data would be substantially lower (e.g., the number of times required to access a random record TR is relatively small compared to the number of times required to access a subsequent record TS). However, when the requested records are not next to each other in the graph index (e.g., all of the records in the subset are separated by other records in the graph index), the time required for obtaining the data would be substantially higher (e.g., the number of times required to access a random record TR is relatively large compared to the number of times required to access a subsequent record TS). For example, to access the records 412, 414, and 416 in the graph index 400, it requires one random access TR for accessing the initial record 412. Once the initial record 412 is accessed, the other records 414 and 416 can be accessed by simply going down the graph index 400 one record at a time (e.g., two times TS). The total amount of time required to access the records 412, 414, and 416 from the graph index 400 is therefore TR+(2×TS). However, imagine if the records 412, 414, and 416 are not next to each other in the graph index 400. That would require three random record accesses (3×TR, which is much larger than TR+(2×TS)) for accessing the same records.

Accordingly, the index generation module 206 may generate the graph index 222 that represents the graph 300 in a manner that would induce fast retrieval of records (e.g., by minimizing random record access operations TR). In some embodiments, the computer system may generate the graph index 222 based on a format (e.g., an arrangement). For example, the records in the graph index 222 may be arranged, based on the format (or arrangement), such that records having a common attribute (e.g., transactions having the same source attribute, etc.) may be grouped together (e.g., stored next to each other) in the graph index 222. This way, when searching for records having a common attribute, the records can be accessed quickly.

When the records in the graph index have more than one attribute, such as in the case of the records of the graph index 222, which includes the source attribute, the time attribute, and the destination attribute (or possibly other attributes in some embodiments), the format used by the index generation module 206 for the graph index 222 may specify an order of priority for the attributes, such as assigning a higher priority to the source attribute, and then a lower priority to the time attribute, and then an even lower priority to the destination attribute. According to this format (e.g., the order of priority), the index generation module 206 may arrange (e.g., sort) the records first based on the source attribute such that records associated with the same source are located next to each other (e.g., consecutive records) in the graph index 222, then based on the time attribute such that transactions associated with the same source and having similar times are located next to each other, and then based on the destination attribute such that the records associated with the same source, the same time, and same destination are located next to each other.

Figure 5:
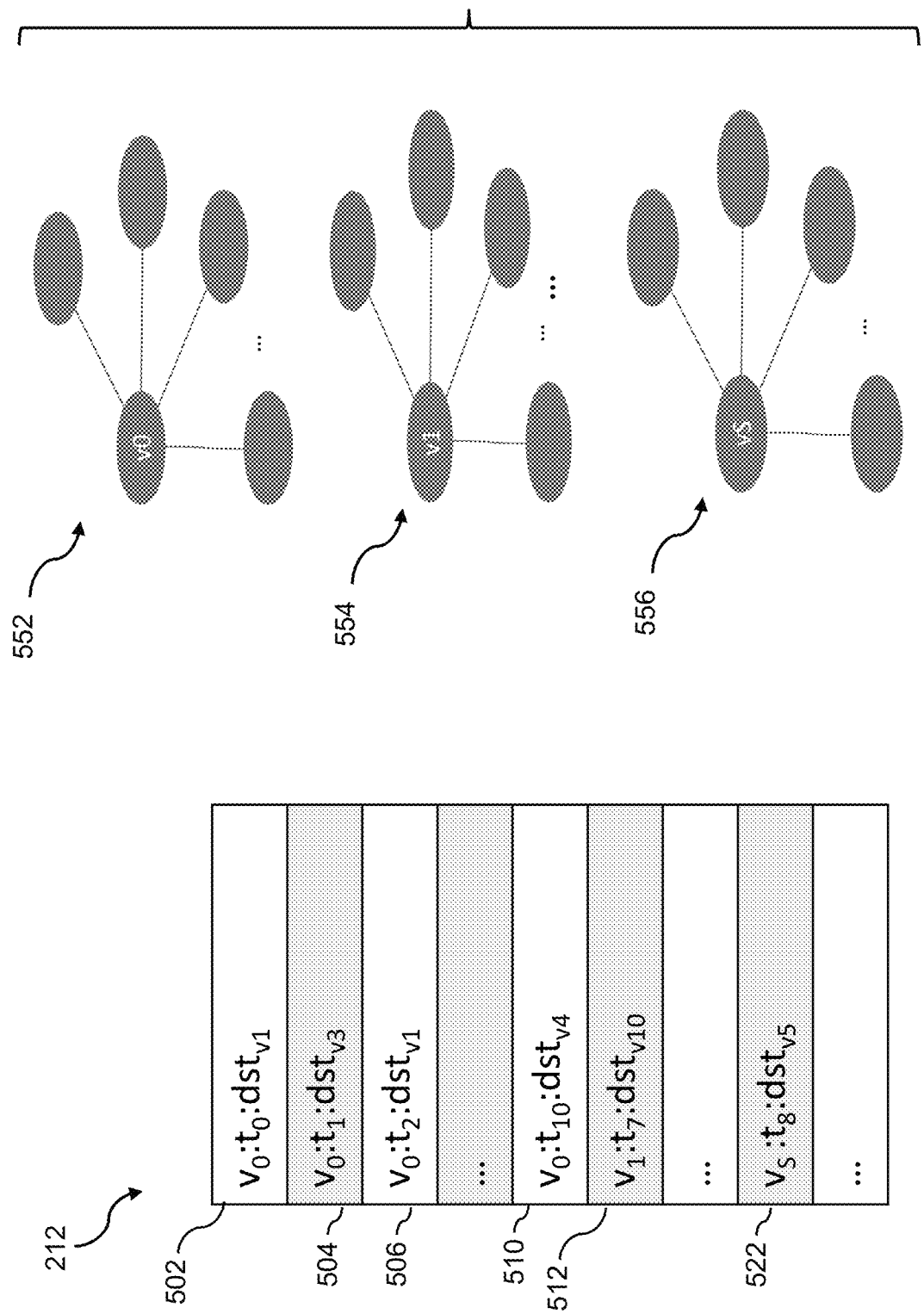
FIGS. 5A and 5B illustrate groups of records in a graph index and corresponding sub-graphs according to an embodiment of the present disclosure.

FIG. 5A illustrates the records in the graph index 222 that are sorted and/or arranged according to the format described above. As shown, the graph index 222 begins with a first group of consecutive records (e.g., records 502-510) that are associated with the transactions having the user account '$v_0$' as the source user account. The graph index 222 continues with a second group of consecutive records (e.g., beginning with record 512) that are associated with the transactions having the user account '$v_1$' as the source user account. The graph index 222 continues with other groups of consecutive records, including an $S^{th}$ group of consecutive records (e.g., beginning with record 522) that are associated with the transactions having the user account '$v_S$' as the source user account.

The records within each group of consecutive records are sorted (or arranged) based on the time attribute. For example, the records within the first group of consecutive records (e.g., the records 502-510) are sorted according to a chronological order, with the transaction that was conducted earliest (e.g., the record 502 having a timestamp of $t_0$) being at the beginning of the first group, followed by a transaction that was conducted next (e.g., the record 504 having a timestamp of $t_1$ that is after the t0), and followed by a transaction that was conducted next (e.g., the record 506 having a timestamp of $t_2$ that is after $t_1$). Other groups of consecutive records are also sorted according to the timestamp as well.

When there are multiple transactions within the same group of consecutive records that were conducted at the same time (e.g., a sub-group of transactions), the sub-group of transactions are sorted according to the destination attribute, such that all transactions having the same destination attribute within each sub-group are grouped together as consecutive records in the graph index 222. FIG. 5B illustrates sub-graphs 552, 554, and 556 of the graph 300 corresponding to the first group of consecutive records, the second group of consecutive records, and the $S^{th}$ group of consecutive records, respectively.

Using the graph index 222, the information retrieval module 132 can retrieve data associated with transactions having the same source attribute quickly. For example, to process a request for accessing all edges connected to a predetermined set of vertices (e.g., transactions initiated by a set of user accounts, such as user accounts $v_0$, $v_1$, and $v_S$), the information retrieval manager 202 may use the query engine 212 to query against the graph index 222 based on the user account identifier associated with user accounts $v_0$, $v_1$, and $v_S$. The time required to access the records would be the sum of the time to access the first record associated with $v_0$ (TR), the time to access a subsequent record (TS) multiplied by the number of records associated with $v_0$ (e.g., the number of transactions conducted by the user account $v_0$), the time to access the first record associated with $v_1$ (TR), the time to access a subsequent record (TS) multiplied by the number of records associated with $v_1$ (e.g., the number of transactions conducted by the user account $v_1$), the time to access the first record associated with $v_S$ (TR), and the time to access a subsequent record (TS) multiplied by the number of records associated with $v_S$ (e.g., the number of transactions conducted by the user account $v_S$).

While the graph index 222 may offer good performance in certain scenarios (e.g., certain types of requests), its performance may suffer in other scenarios (e.g., other types of requests). For example, when the request is for accessing edges that are connected among a predetermined set of vertices (e.g., transactions conducted among a set of user accounts, such as $v_1$, $v_2$, and $v_S$), the time required for accessing the records may take substantially longer. It is because the records associated with transactions conducted by each particular pair of user accounts may not be arranged to group together (e.g., not consecutive records), for example, when one user account has conducted transactions with many different other user accounts over a period of time. For example, both of the records 502 and 506 are associated with transactions conducted between user accounts $v_0$ and $v_1$ at different times $t_0$ and $t_2$, respectively. However, the records 502 and 506 are not consecutive records as they are separated by the record 504 associated with a transaction conducted between user accounts $v_0$ and $v_3$ at time $t_1$, because $t_1$ is after $t_0$ but before $t_2$. Thus, it would require two random record accesses (2 TRs) in order to retrieve the records 502 and 506. Imagine if the two records 502 and 506 are consecutive records, the time required to access these two records would have been one random record access (TR) plus one consecutive record access (TS), which is substantially faster than two random record accesses (2 TRs). Using the graph index 222, the time required (query latency) to access a sub-graph representing transactions among a set of user accounts conducted within a particular period of time can be calculated using the following formula:

$$T = TR \times S(V) + TS \times \Sigma_{i=0}^{i=S(V)} S(E(v_i)), (v_i \in V) \quad (1)$$

where S(V) is the number of vertices in the sub-graph, E(v) is the set of edges connected to vertex $v_i$ within the particular period of time, ($v_i \in V$), and $S(E(v_i))$ is the number of edges in the set of edges $E(v_i)$ (i.e., the degree of $v_i$, ($v_i \in V$).

Thus, according to various embodiments of the disclosure, the index generation module 206 may generate another graph index 224 based on the graph data 230 according to a different format (e.g., a different arrangement). In some embodiments, the graph index 224 may include the same records as the graph index 222, only in a different format and arrangement. Under this format, the records are arranged in the graph index 224 based on a different order of priority for the attributes. For example, based on this format, the index generation module 206 may assign a higher priority to the source attribute, a lower priority to the destination attribute, and an even lower priority to the time attribute (that is, the order of priority between the destination attribute and the time attribute is switched from the format associated with the graph index 222). According to the this format, the index generation module 206 may arrange (e.g., sort) the records first based on the source attribute such that records associated with the same source are located near each other in the graph index, and based on the destination attribute such that transactions associated with the same source and the same destination are located near each other, and then based on the time attribute such that the transaction records associated with the same source and destination, and having similar times are located near each other.

Figure 6:
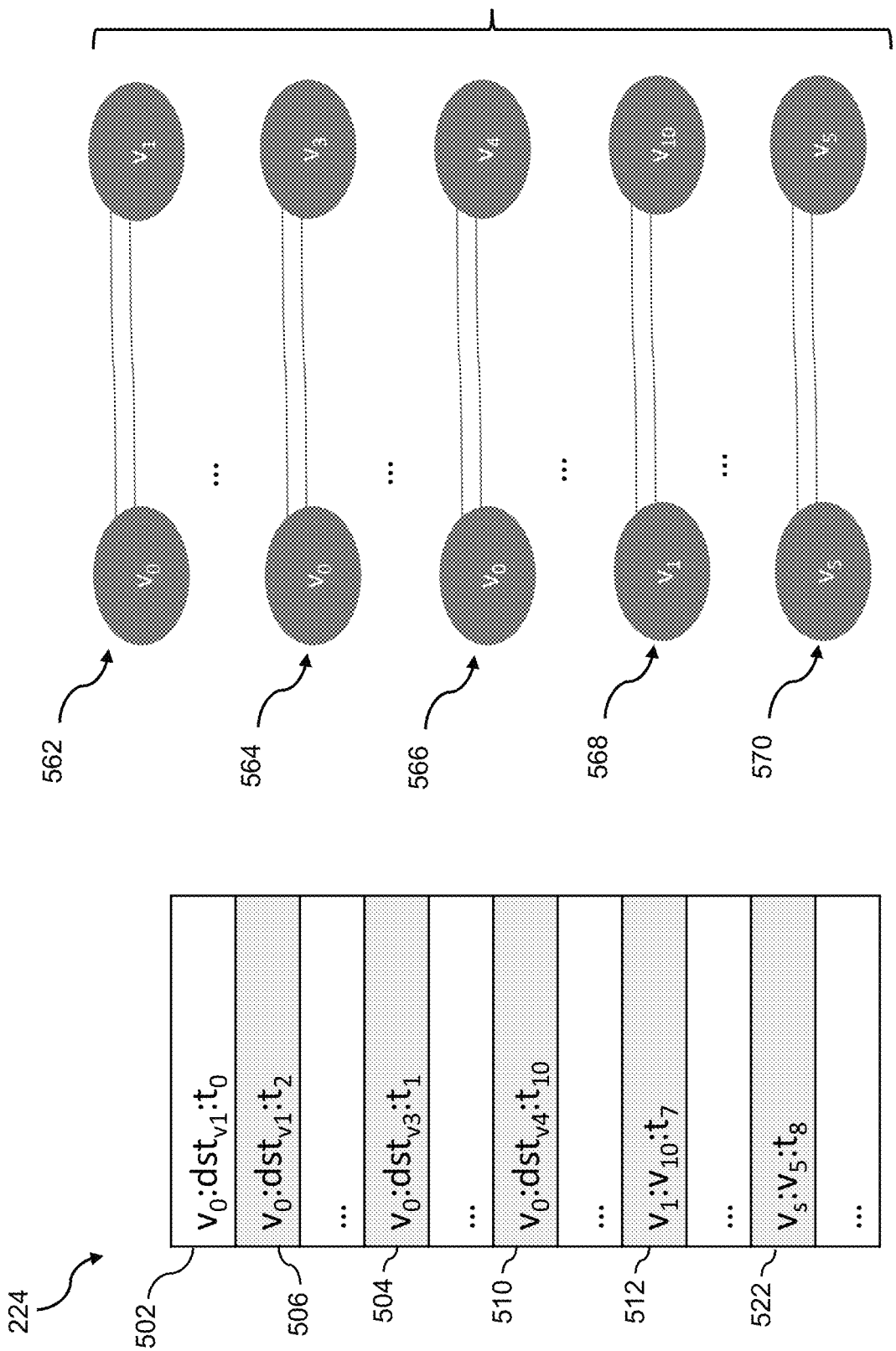
FIGS. 6A and 6B illustrate groups of records in another graph index and corresponding sub-graphs according to an embodiment of the present disclosure.

FIG. 6A illustrates the records in the graph index 224 that are sorted and/or arranged according to the format described above. Similar to the graph index 222, the graph index 224 groups records having the same source attribute together. Specifically, the graph index 224 begins with a first group of consecutive records (e.g., records 502-510) that are associated with the transactions having the user account 'v0' as the source user account. The graph index 212 continues with a second group of consecutive records (e.g., beginning with record 512) that are associated with the transactions having the user account 'v1' as the source user account. The graph index 212 continues with other groups of consecutive records, including an $S^{th}$ group of consecutive records (e.g., beginning with record 522) that are associated with the transactions having the user account 'vS' as the source user account.

Unlike the graph index 222, the records within each group of consecutive records in the graph index 224 are sorted (or arranged) based on the destination attribute, instead of the time attribute. For example, the records having the same destination attribute within the first group of consecutive records (e.g., the records 502 and 506) are grouped together as consecutive records (as a sub-group of consecutive records), and then sorted according to a chronological order based on the times of the transactions. Other groups of consecutive records in the graph index 224 are also similarly grouped and sorted. FIG. 6B illustrates sub-graphs 562, 564, 566, 568, and 570 of the graph 300 corresponding to the various sub-groups of consecutive records, where each sub-group of consecutive record is associated with transactions conducted between a particular pair of user accounts. For example, the sub-graph 562 include edges between the vertices corresponding to the user accounts v0 and v1 (thus, representing the transactions between the user accounts v0 and v1, and corresponding to the records 502 and 506). The sub-graph 564 include edges between the vertices corresponding to the user accounts v0 and v3 (thus, representing the transactions between the user accounts v0 and v3, and corresponding to records including the record 504). The sub-graph 566 include edges between the vertices corresponding to the user accounts v0 and v4 (thus, representing the transactions between the user accounts v0 and v4, and corresponding to records including the record 510). The sub-graph 568 include edges between the vertices corresponding to the user accounts v1 and v10 (thus, representing the transactions between the user accounts v1 and v10, and corresponding to records including the record 512). The sub-graph 570 include edges between the vertices corresponding to the user accounts vS and v5 (thus, representing the transactions between the user accounts vS and v5, and corresponding to records including the record 522).

Using the graph index 224, the time required (query latency) to access a sub-graph representing transactions among a set of user accounts conducted within a particular period of time can be calculated using the following formula:

$$TR \times C_{S(V)}^2 + TS \times \sum_{i=0}^{i=S(V)-1} \sum_{j=i+1}^{j=S(V)} S(E(v_i, v_j)), (v_i, v_j \in V) \quad (2)$$

where $E(v_i, v_j)$ is the set of edges between vertices $v_i$ and $v_j$ associated with transactions conducted between $v_i$ and $v_j$ within the particular period of time, $S(E(v_i, v_j))$ is the number of edges in the set of edges $E(v_i, v_j)$, and $C_{S(V)}^2$ is the number of vertex pairs in the set of vertex in the sub-graph.

The different order of priority in formatting the records in the graph index 224 enables the retrieval of certain records more quickly than by using the graph index 222. Since the records associated with transactions conducted between each pair of user accounts (e.g., edges between each pair of vertices) are stored consecutively within the graph index 224, those records associated with transactions conducted between each pair of user accounts can be retrieved quickly. The performance of retrieving records using the graph index 224 is greater when the number of transactions associated with each user account in the sub-graph (e.g., the degree of each vertex) is large and/or the number of vertices within the sub-graph is smaller. In an example where the number of vertices in the requested sub-graph is 10, the number of edges connected to each vertex in the sub-graph is 1,000,000, and the number of edges connected to each pair of vertices in the sub-graph is 1,000, the time required for accessing data associated with the sub-graph (assuming TR is 1,000 and TS is 1) using the graph index 222 is 10,010,000 (using Equation (1)) and the time required for accessing data associated with the sub-graph using the graph index 224 is 90,000 (using Equation (2)). However, when the number of transactions between each pair of user accounts (e.g., the number of edges between each pair of vertices) is smaller and/or the number of vertices in the sub-graph is large, the graph index 222 performs better than the graph index 224. In another example where the number of vertices in the requested sub-graph is 100, the number of edges connected to each vertex in the sub-graph is 1,000, and the number of edges connected to each pair of vertices in the sub-graph is 10, the time required for accessing data associated with the sub-graph (assuming TR is 1,000 and TS is 1) using the graph index 222 is 200,000 (using Equation (1)) and the time required for accessing data associated with the sub-graph using the graph index 224 is 4,999,500 (using Equation (2)).

Thus, according to various embodiments of the disclosure, to enhance the performance of data retrieval from a graph, the information retrieval module 132 may analyze the request for a sub-graph and selectively using one or more graph indices, from multiple graph indices, to retrieve data associated with the sub-graph based on the characteristics of the sub-graph. In some embodiments, the index selection module 208 may analyze characteristics of the sub-graph (e.g., edge-based attributes such as a number of edges associated with each vertex in the sub-graph, vertex-based attributes such as the number of vertices in the sub-graph, etc.) in the request for determining which one or more graph indices (e.g., graph indices 222 and 224, etc.) to use for retrieving data associated with the sub-graph.

In some embodiments, the information retrieval manager 202 may analyze the graph 300 and determine characteristics of the graph 300 (e.g., edge-based attributes such as a number of edges associated with each vertex in the sub-graph, vertex-based attributes such as the number of vertices in the sub-graph, etc.) as graph attributes 240 prior to receiving a request for accessing data associated with the graph 300. The information retrieval manager 202 may also store the graph attributes 240, for example, as a database, in the data storage 220. Thus, when the information retrieval manager 202 receives a request for data associated with a portion of the graph 300 (e.g., a sub-graph), the computer system may access the graph attributes 240 to determine characteristics of the sub-graph (e.g., the number of edges associated with each vertex in a subset of vertex within the sub-graph, the number of vertices in the sub-graph, etc.). Based on the characteristics of the sub-graph, the index selection module 208 may select one or more graph indices, from the graph indices generated for the graph 300 (e.g., the graph indices 222 and 224), for retrieving data associated with the sub-graph.

Since the graph 300 may be modified over time (e.g., adding or removing indices based on users joining or leaving the transaction system, adding or modifying edges based on transactions conducted among users, etc.), the information retrieval module 202 may update the graph attributes 240 as well as the graph indices 222 and 224 to reflect the state of the graph 300 (e.g., periodically, whenever a change occurs in the graph 300, etc.).

In some embodiments, the index selection module 208 may determine to use one of the graph indices 222 and 224 based on a comparison between the characteristics of the sub-graph and a threshold. For example, the index selection module 208 may determine to use the graph index 222 for retrieving data associated with the sub-graph when an edge-based attribute (e.g., the total number of edges in the sub-graph an average number of edges associated with a vertex in the sub-graph, a range of numbers of edges in the sub-graph, etc.) is below an edge threshold, or when the number of vertices in the sub-graph is above a vertex threshold. Similarly, the index selection module 208 may determine to use the graph index 224 for retrieving data associated with the sub-graph when the edge-based attribute (e.g., the total number of edges in the sub-graph an average number of edges associated with a vertex in the sub-graph, a range of numbers of edges in the sub-graph, etc.) is above the edge threshold, or when the number of vertices in the sub-graph is below the vertex threshold.

Figure 7:
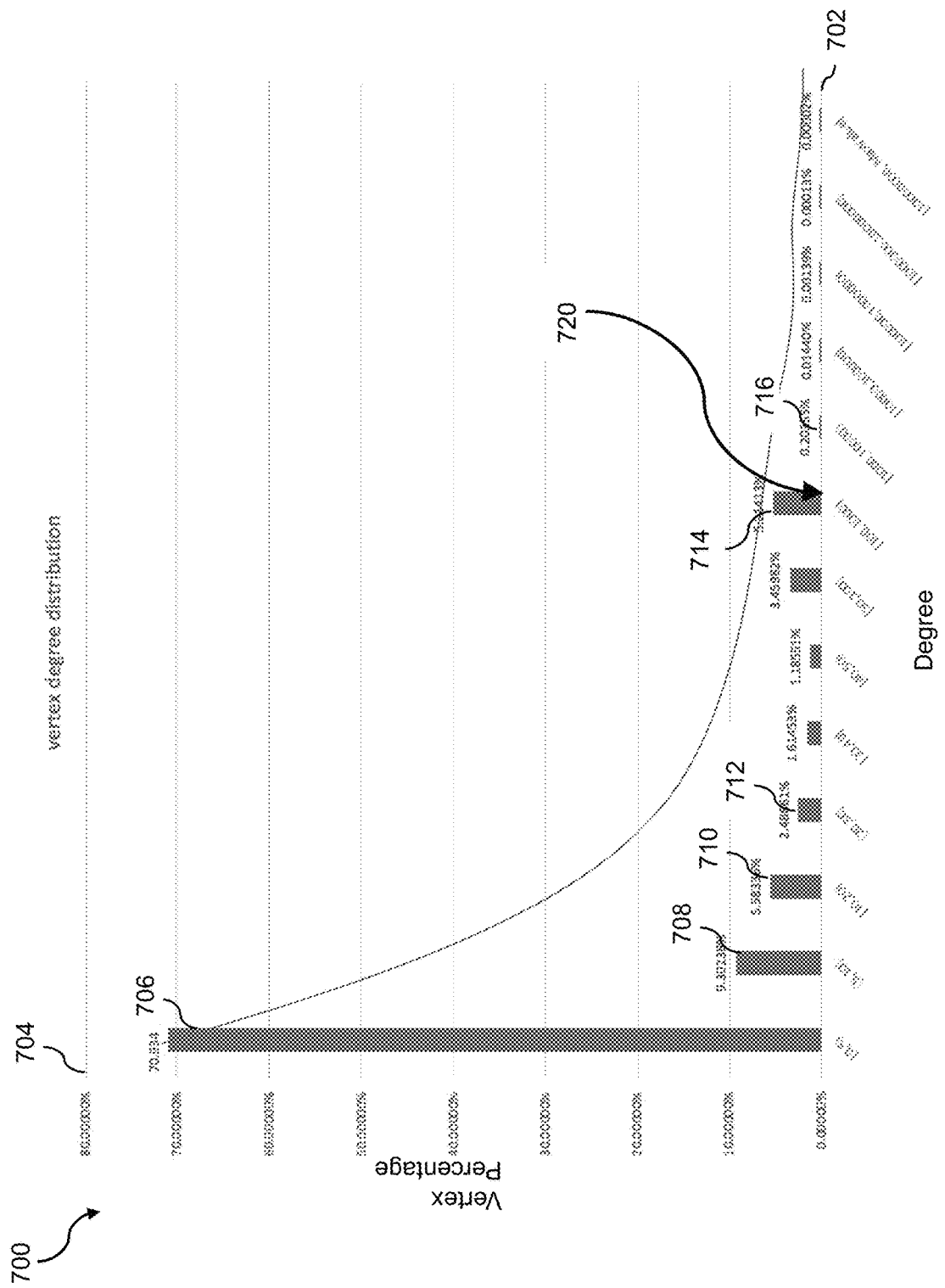
FIG. 7 illustrates an exemplary distribution of degrees across a set of vertices in a graph according to an embodiment of the present disclosure.

In some embodiments, the thresholds may be determined to be different for different graphs based on different characteristics of the graphs. As such, the index selection module 208 may determine the threshold(s) for the graph 300 based on characteristics of the graph 300. In some embodiments, to determine the edge threshold for the graph 300, the index selection module 208 may first determine a distribution of degrees (e.g., the spread of number of edges for the vertices in the graph 300) across the set of vertices in the graph 300. The distribution may indicate a number of (or a percentage of) vertices in the graph 300 having a particular number of edges (or a range of numbers of edges). FIG. 7 illustrates an example distribution of degrees 700 based on the graph 300, generated by the index selection module 208. The distribution 700 is presented as a bar chart having a horizontal axis 702 representing the different ranges of numbers of edges and a vertical axis 703 representing the percentages of vertices in the graph 300. As shown, the distribution 700 indicates that 70% of the vertices in the graph have between 0 and 5 edges (as indicated by the bar 706), 9% of the vertices in the graph may have between 5 and 10 edges (as indicated by the bar 708), 5% of the vertices in the graph have between 10 and 20 edges (as indicated by the bar 710), 2% of the vertices in the graph have between 20 and 30 edges (as indicated by the bar 712), and so forth. The index selection module 208 may determine an edge threshold (also referred to as the "critical point") for the graph 300 based on the distribution 700, where the reduction in the number (or percentage) of vertices associated with the number of edges (or the range of numbers of edges) immediately below the edge threshold and the number (or percentage) of vertices associated with the number of edges (or the range of numbers of edges) immediately above the edge threshold number is the greatest. In the example illustrated in FIG. 7, the index selection module 208 may determine the edge threshold to be 1,000 (at the point 720), as the percentage of vertices that fall in the group immediately below the edge threshold at 5.2% (as indicated by the bar 714) and the percentage of vertices that fall in the group immediately above the edge threshold at 0.2% (as indicated by the bar 716) represent the greatest reduction in percentage between two adjacent groups in the distribution 700.

Since the graph 300 may be modified over time (e.g., adding or removing indices based on users joining or leaving the transaction system, adding or modifying edges based on transactions conducted among users, etc.), the index selection module 208 may update the threshold(s) based on updated characteristics of the graph 300 (e.g., periodically, whenever a change occurs in the graph 300, etc.). In some embodiments, the index selection module 208 may dynamically determine the threshold(s) based on the updated graph attributes 240.

In some embodiments, to further enhance the performance of retrieving data associated with the graph 300, instead of selecting one or more graph indices to process an entire data retrieval request, the index selection module 208 may use the query division module 210 to divide the data retrieval request into different portions and use different graph indices to process the different portions of the data retrieval request. For example, the query division module 210 may divide the data retrieval request into two or more portions (e.g., divide the sub-graph associated with the data retrieval request into two or more portions of the sub-graph) based on analyzing attributes (e.g., edge-based attributes such as the number of edges associated with each vertex) of different parts (e.g., different vertices) within the sub-graph. In some embodiments, the query division module 210 may determine a first portion of the sub-graph based on the vertices in the first portion of the sub-graph having edge-based attributes below the threshold (e.g., the number of edges associated with each vertex in the first portion of the sub-graph being below the threshold) and determine a second portion of the sub-graph based on the vertices in the second portion of the sub-graph having edge-based attributes above the threshold.

Figure 8:
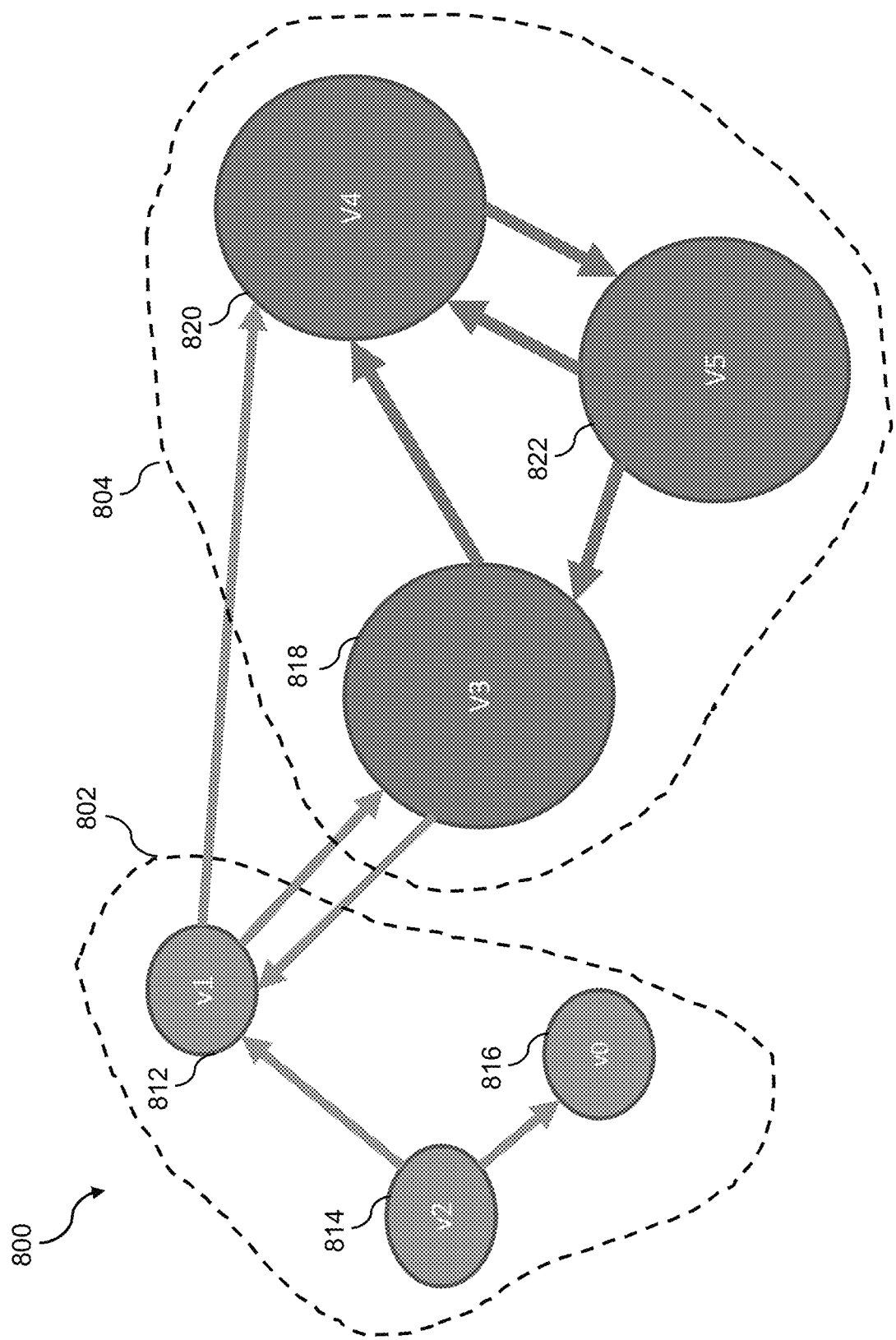
FIG. 8 illustrates a division of a sub-graph according to an embodiment of the present disclosure.

FIG. 8 illustrates a sub-graph 800 from the graph 300 that is associated with the data retrieval request. The sub-graph 800 is shown to include six vertices 812-822. Each of the vertices 812-822 may be associated with (connected by) a set of edges, some of which may be connected to another vertex within the sub-group and some of which may be connected to vertices outside of the sub-group. In some embodiments, the query division module 210 may access the attributes of the set of vertices (812-822) from the graph attributes 240. The query division module 210 may determine from the graph attributes 240, that each of the vertices 812-816 is associated with a number of edges below the edge threshold, and that each of vertices 818-822 is associated with a number of edges above the edge threshold. Thus, the query division module 210 may include the vertices 812-816 in the first portion of the sub-group 800 and include the vertices 818-822 in the second portion of the sub-group 800.

The index selection module 208 may then assign the graph index 222 for processing the first portion of the request (e.g., the first portion of the sub-group 800) based on the edge-based attributes of the vertices within the first portion of the sub-group 800 being below the edge threshold and assign the graph index 224 for processing the second portion of the request (e.g., the second portion of the sub-group 800) based on the edge-based attributes of the vertices within the second portion of the sub-group 800 being above the edge threshold.

The information retrieval manager 202 may then use the query engine 212 to retrieve first data associated with the first portion of the sub-graph 800 using the graph index 222 (e.g., obtaining records associated with the vertices 812-816 from the graph index 222), and retrieve second data associated with the second portion of the sub-graph 800 using the graph index 224 (e.g., obtaining records associated with the vertices 818-822 from the graph index 224). The information retrieval manager 202 may combine the first data and the second data to generate the output data for the data retrieval request, and may transmit the output data to the requesting device (e.g., the device 180).

While only two graph indices are generated and used for processing data retrieval requests in the example described above, it has been contemplated that the index generation module 206 may generate more than two graph indices based on different formats (different arrangements). For example, the index generation module 206 may generate another graph index that is formatted based on an order of priority, the order of priority specifying that the destination attribute has the highest priority, and then followed by the source attribute, and then followed by the time attribute. The index selection module 208 may also be configured to use other types of threshold (instead of or in addition to the edge threshold and/or the vertex threshold) to select graph indices for use in processing a data retrieval request. Furthermore, while the graph in the example illustrated above represents transactions among user accounts, the data retrieval techniques as disclosed herein may apply to other types of graphs that represent different relationships of data (e.g., relationships among users or user accounts in a social network, etc.).

Figure 9:
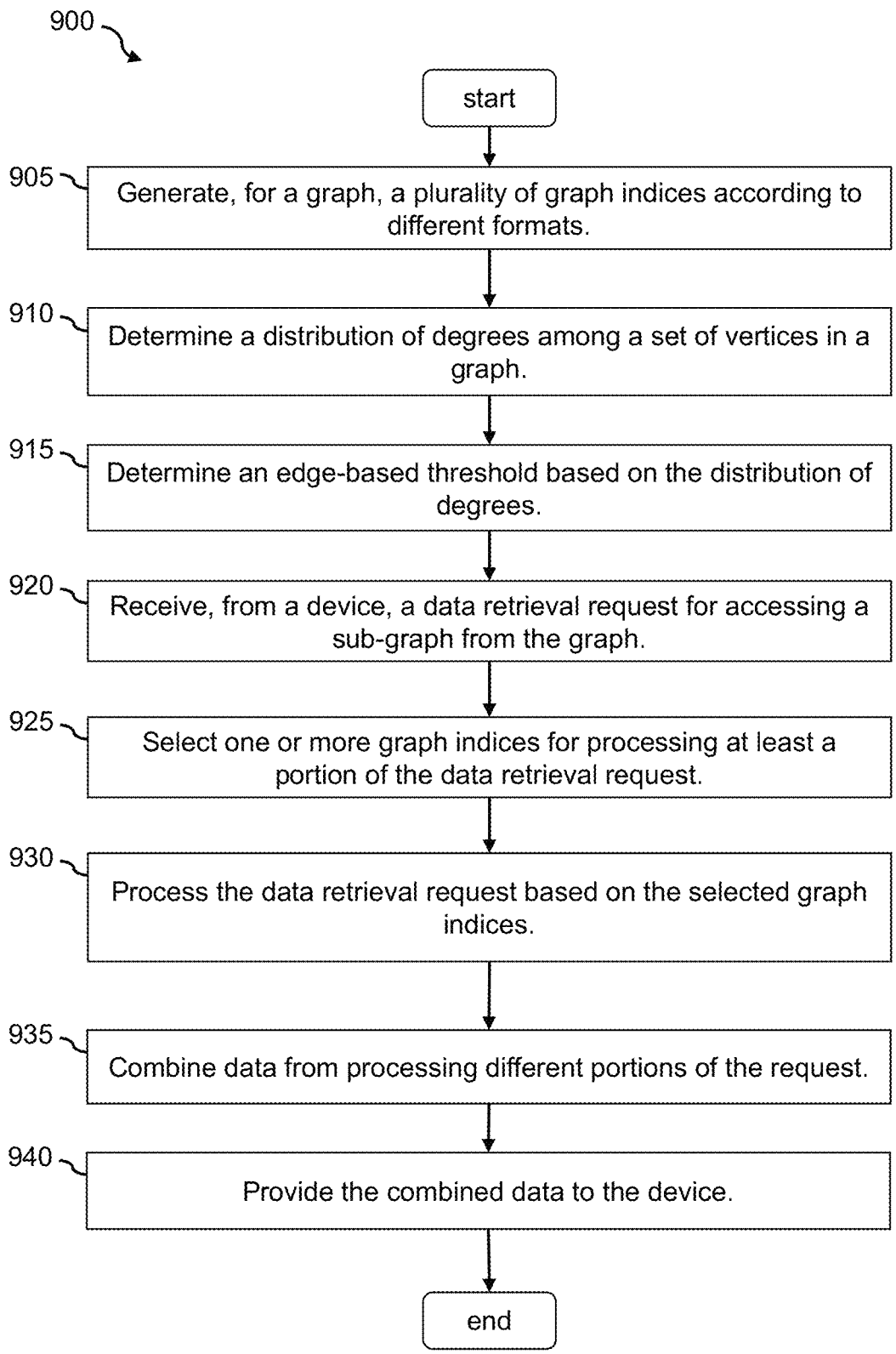
FIG. 9 is a flowchart showing a process of retrieving data associated with a portion of a graph according to an embodiment of the present disclosure.

FIG. 9 illustrate a process 900 for retrieving data associated with a graph according to one embodiment of the disclosure. In some embodiments, at least some of all of the steps in the process 900 may be performed by the information retrieval module 132 and the query engine 212. The process 900 begins by generating (at step 905), for a graph, a plurality of indices according to different formats. For example, the index generation module 206 may generate multiple graph indices, such as the graph indices 222 and 224, based on graph data 230 of the graph 300. The graph indices 222 and 224 are generated in different formats. Specifically, while the graph indices 222 and 224 store/contain the same records of data associated with the graph 300 (e.g., each record may correspond to an edge in the graph 300), the records may be ordered/arranged differently in the graph indices 222 and 224. Specifically, the graph index 222 may order the records first based on the source attribute, then on the time attribute, and then on the destination attribute. By contrast, the graph index 224 may order the records first based on the source attribute, then on the destination attribute, and then on the time attribute.

The process 900 then determines (at step 910) a distribution of degrees among a set of vertices in the graph and determines (at step 915) an edge-based threshold based on the distribution of degrees. For example, the information retrieval manager 202 may analyze the graph data 230 and may determine graph attributes 240. The graph attributes 240 may include the number of edges that are associated with each vertex (a degree of the vertex) in the graph 300. Based on the graph attributes 240, the index selection module 208 may determine a distribution of degrees across the set of vertices in the graph 300, such as the distribution 700. Based on the distribution 700, the index selection module 208 may determine an edge-based threshold (also known as the critical point) for selecting which graph index to use for processing a data retrieval request.

The process 900 receives (at step 920), from a device, a data retrieval request for accessing a sub-graph from the graph. For example, the information retrieval manager 202 may receive a data retrieval request from the device 180. The request may be associated with accessing at least a portion of the graph 300 (e.g., a sub-graph). In one example, the request may be for accessing all transactions conducted among a set of user accounts within a period of time (corresponding to edges connected among a set of vertices in the graph 300).

The process 900 then selects (at step 925) one or more graph indices for processing the data retrieval request and processes (at step 930) the data retrieval request based on the selected graph indices. For example, the index selection module 208 may analyze the data retrieval request and the attributes associated with the sub-graph (e.g., how many vertices are in the sub-graph, what are the degrees of the vertices in the sub-graph, etc.), and may select one or more of the graph indices 222 and 224 for processing at least a portion of the data retrieval request based on the analysis and the threshold. In some embodiments, the index selection module 208 may select the graph index 222 for processing the data retrieval request when the edge-based attributes (e.g., the number of edges associated with each vertex in the sub-graph, the average number of edges associated with the vertices in the sub-graph, etc.) is below the edge threshold and may select the graph index 224 for processing the data retrieval request when the edge-based attributes (e.g., the number of edges associated with each vertex in the sub-graph, the average number of edges associated with the vertices in the sub-graph, etc.) is above the edge threshold.

In some embodiments, the index selection module 208 may use the query division module 210 to divide the sub-graph into different portions of the sub-graph based on the attributes of the vertices in the sub-graph. For example, the query division module 210 may include vertices in the sub-graph that have degrees below the edge threshold in a first portion of the sub-graph and include vertices in the sub-graph that have degrees above the edge threshold in a second portion of the sub-graph. The index selection module 208 may then select the graph index 222 for use in processing a portion of the data retrieval request corresponding to the first portion of the sub-graph and may select the graph index 224 for use in processing another portion of the data retrieval request corresponding to the second portion of the sub-graph. The information retrieval manager 202 may use the query engine 212 to obtain records corresponding to the first portion of the sub-graph using the graph index 222 and to obtain records corresponding to the second portion of the sub-graph using the graph index 224.

The process 900 then combines (at step 935) data from processing different portions of the request and provides (at step 940) the combined data to the device. When the index selection module 208 uses the query division module 210 to divide the data retrieval request into different portions for processing (and may use different graph indices for processing the different portions of the request), once the data is obtained from the query engine 212, the information retrieval manager 202 may combine the different data (e.g., the different records retrieved from the graph indices 222 and 224 separately). The information retrieval manager 200 may present the combined data to the device 180. In some embodiments, the information retrieval manager 200 may use the graph generation module 204 to generate the sub-graph based on the records retrieved from the graph indices 222 and/or 224, and may present the sub-graph on the device 180.

Figure 10:
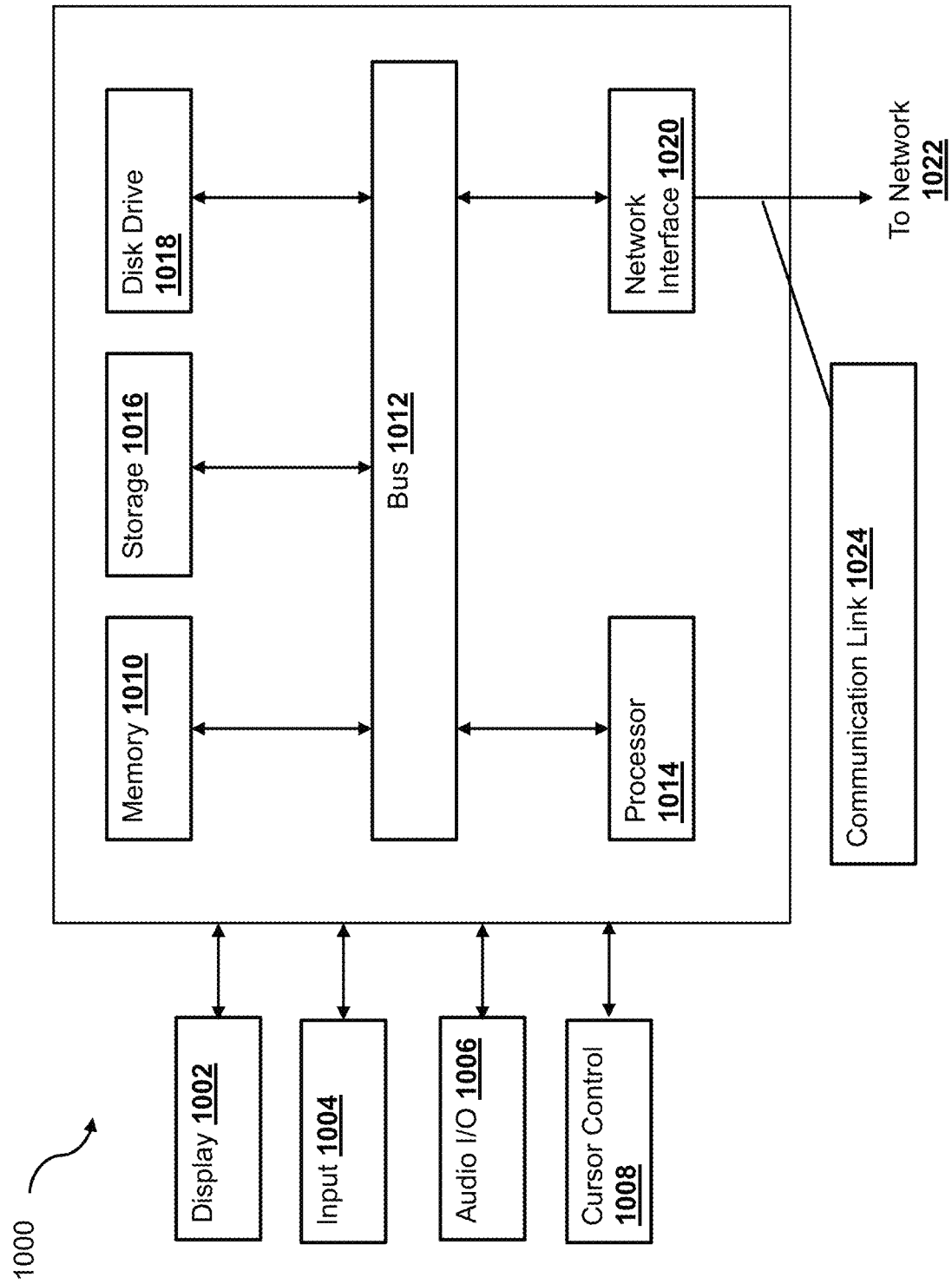
FIG. 10 is a block diagram of a system for implementing a device according to an embodiment of the present disclosure.

FIG. 10 is a block diagram of a computer system 1000 suitable for implementing one or more embodiments of the present disclosure, including the service provider server 130, the merchant server 120, the user device 110, and the device 180. In various implementations, each of the user device 110 and the device 180 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 180, 120, and 130 may be implemented as the computer system 1000 in a manner as follows.

The computer system 1000 includes a bus 1012 or other communication mechanism for communicating information data, signals, and information between various components of the computer system 1000. The components include an input/output (I/O) component 1004 that processes a user (i.e., sender, recipient, service provider) action, such as selecting keys from a keypad/keyboard, selecting one or more buttons or links, etc., and sends a corresponding signal to the bus 1012. The I/O component 1004 may also include an output component, such as a display 1002 and a cursor control 1008 (such as a keyboard, keypad, mouse, etc.). The display 1002 may be configured to present a login page for logging into a user account or a checkout page for purchasing an item from a merchant. An optional audio input/output component 1006 may also be included to allow a user to use voice for inputting information by converting audio signals. The audio I/O component 1006 may allow the user to hear audio. A transceiver or network interface 1020 transmits and receives signals between the computer system 1000 and other devices, such as another user device, a merchant server, or a service provider server via network 1022. In one embodiment, the transmission is wireless, although other transmission mediums and methods may also be suitable. A processor 1014, which can be a micro-controller, digital signal processor (DSP), or other processing component, processes these various signals, such as for display on the computer system 1000 or transmission to other devices via a communication link 1024. The processor 1014 may also control transmission of information, such as cookies or IP addresses, to other devices.

The components of the computer system 1000 also include a system memory component 1010 (e.g., RAM), a static storage component 1016 (e.g., ROM), and/or a disk drive 1018 (e.g., a solid-state drive, a hard drive). The computer system 1000 performs specific operations by the processor 1014 and other components by executing one or more sequences of instructions contained in the system memory component 1010. For example, the processor 1014 can perform the data retrieval functionalities described herein according to the process 900.

Logic may be encoded in a computer readable medium, which may refer to any medium that participates in providing instructions to the processor 1014 for execution. Such a medium may take many forms, including but not limited to, non-volatile media, volatile media, and transmission media. In various implementations, non-volatile media includes optical or magnetic disks, volatile media includes dynamic memory, such as the system memory component 1010, and transmission media includes coaxial cables, copper wire, and fiber optics, including wires that comprise the bus 1012. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 1000. In various other embodiments of the present disclosure, a plurality of computer systems 1000 coupled by the communication link 1024 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
receiving, from a device, a query for accessing a sub-graph of a graph, wherein the graph comprises a set of vertices and a plurality of edges connecting the set of vertices;
identifying, from the set of vertices of the graph, a subset of vertices associated with the sub-graph based on the query;
analyzing edge-based attributes associated with the subset of vertices in the sub-graph;
selecting, from a plurality of graph indices that indexes the graph using different formats, a first graph index for processing at least a portion of the query based on the edged-based attributes associated with the subset of vertices;
processing at least the portion of the query using the first graph index;
obtaining data related to the sub-graph based at least in part on the processing; and
transmitting the data to the device.

2. The system of claim 1, wherein the analyzing the edge-based attributes associated with the subset of vertices comprises:
comparing an edge-based attribute associated with each vertex in the subset of the vertices against an edge-based threshold.

3. The system of claim 2, wherein the operations further comprise:
analyzing edge-based statistics associated with the graph; and
determining the edge-based threshold based on the analyzing the edge-based statistics.

4. The system of claim 2, wherein the edge-based threshold represents a threshold number of edges associated with a vertex.

5. The system of claim 1, wherein the operations further comprise:
dividing the subset of the vertices into a first group of vertices and a second group of vertices;
processing a first portion of the query associated with the first group of vertices using the first graph index; and
obtaining first data associated with a first portion of the sub-graph based on the processing the first portion of the query using the first graph index.

6. The system of claim 5, wherein the operations further comprise:
processing a second portion of the query associated with the second group of vertices using a second graph index from the plurality of graph indices;
obtaining second data associated with a second portion of the sub-graph based on the processing the second portion of the query using the second graph index; and
combining the first data and the second data.

7. The system of claim 5, wherein each vertex in the first group of vertices has an edge-based attribute above an edge-based threshold, and wherein each vertex in the second group of vertices has an edge-based attribute below the edge-based threshold.

8. A method, comprising:
receiving, by one or more hardware processors from a device, a request for accessing data associated with a portion of a graph, wherein the graph comprises a set of vertices;
identifying, from the set of vertices of the graph, a subset of vertices associated with the portion of the graph;
analyzing, by the one or more hardware processors, attributes associated with the subset of vertices in the sub-graph;
dividing, by the one or more hardware processors, the subset of vertices into a first group of vertices and a second group of vertices;
obtaining, by the one or more hardware processors, first data associated with the first group of vertices using a first graph index that indexes the graph in a first format;
obtaining, by the one or more hardware processors, second data associated with the second group of vertices using a second graph index that indexes the graph in a second format different from the first format; and
transmitting the first and second data to the device.

9. The method of claim 8, wherein the first graph index comprises graph data associated with the graph that are arranged according to a first ordering scheme, and wherein the second graph index comprises the graph data that is arranged according to a second ordering scheme different from the first ordering scheme.

10. The method of claim 9, wherein the first ordering scheme specifies that the graph data is arranged based on a first priority ranking among a set of attributes associated with the graph data, and wherein the second ordering scheme specifies that the graph data is arranged based on a second priority ranking among the set of attributes that is different from the first priority ranking.

11. The method of claim 8, further comprising:
determining a distribution of degrees across the set of vertices in the graph, wherein the degrees represent, for each vertex in the set of vertices, a number of edges associated with the vertex; and
determining an edge-based threshold based on the distribution, wherein the analyzing the attributes associated with the subset of vertices comprises comparing, for each vertex in the subset of vertices, an edge-based attribute of the vertex against the edge-based threshold.

12. The method of claim 8, wherein the request is for accessing information associated with edges between vertices in the subset of vertices.

13. The method of claim 8, wherein the graph represents transactions among a plurality of user accounts, wherein each vertex in the set of vertices represents a user account, and wherein each edge between two vertices represents a transaction between two user accounts corresponding to the two vertices.

14. The method of claim 8, wherein the graph represents a social network, wherein each vertex in the set of vertices represents a user account, and wherein each edge between two vertices represents an interaction between two user accounts corresponding to the two vertices.

15. A non-transitory machine-readable medium having stored thereon machine-readable instructions executable to cause a machine to perform operations comprising:

receiving, from a device, a request for accessing a sub-graph of a graph, wherein the graph comprises a set of vertices and a plurality of edges connecting the set of vertices;

identifying, from the set of vertices of the graph, a subset of vertices associated with the sub-graph based on the request;

analyzing attributes associated with the subset of vertices in the sub-graph;

selecting, from a plurality of graph indices that indexes the graph using different formats, a first graph index for processing at least a portion of the query based on a comparison between the attributes associated with the subset of vertices and a threshold;

processing at least the portion of the request using the first graph index;

obtaining data related to the sub-graph based at least in part on the processing; and transmitting the data to the device.

16. The non-transitory machine-readable medium of claim 15, wherein the operations further comprise:
generating the sub-graph based on the data; and
presenting the sub-graph on the device.

17. The non-transitory machine-readable medium of claim 15, wherein the operations further comprise:
analyzing characteristics associated with the graph; and
determining the threshold based on the analyzing the characteristics.

18. The non-transitory machine-readable medium of claim 15, wherein the threshold represents a threshold number of edges associated with a vertex.

19. The non-transitory machine-readable medium of claim 15, wherein the operations further comprise:
dividing the subset of the vertices into a first group of vertices and a second group of vertices;
processing a first portion of the request associated with the first group of vertices using the first graph index; and
obtaining first data associated with a first portion of the sub-graph based on the processing the first portion of the request using the first graph index.

20. The non-transitory machine-readable medium of claim 19, wherein the operations further comprise:
processing a second portion of the request associated with the second group of vertices using a second graph index from the plurality of graph indices;
obtaining second data associated with a second portion of the sub-graph based on the processing the second portion of the request using the second graph index; and
combining the first data and the second data.

* * * * *